United States Patent
Weis

(10) Patent No.: US 6,625,339 B2
(45) Date of Patent: *Sep. 23, 2003

(54) OPTICAL CONNECTION AND CONNECTION UNIT FOR THE EXCHANGE OF DATA BETWEEN DEVICES

(75) Inventor: Bernd X. Weis, Korntal-Münchingen (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,228

(22) Filed: May 24, 1999

(65) Prior Publication Data
US 2001/0046347 A1 Nov. 29, 2001

(30) Foreign Application Priority Data
May 27, 1998 (DE) .......................... 198 23 587

(51) Int. Cl.⁷ .................................. G02B 6/26
(52) U.S. Cl. ........................... 385/16; 359/159
(58) Field of Search ................ 385/16, 31, 24, 385/88–94, 14; 359/109, 132, 152, 154, 159, 158; 367/138; 257/81; 455/607

(56) References Cited

U.S. PATENT DOCUMENTS

| | | | |
|---|---|---|---|
| 4,850,044 A | * | 7/1989 | Block et al. ................. 359/159 |
| 5,091,985 A | | 2/1992 | Heidemann |
| 5,182,780 A | * | 1/1993 | Robertson ..................... 385/14 |
| 5,200,631 A | * | 4/1993 | Austin et al. ................ 257/570 |
| 5,469,442 A | * | 11/1995 | Seligmann et al. ..... 340/870.04 |
| 5,675,554 A | * | 10/1997 | Cole et al. .................... 367/138 |
| 5,818,984 A | * | 10/1998 | Ahmad et al. ................. 385/14 |
| 5,909,298 A | * | 6/1999 | Shimada et al. ............. 359/162 |
| 5,946,120 A | * | 8/1999 | Chen ........................... 359/158 |
| 5,953,690 A | * | 9/1999 | Lemon et al. ............... 702/191 |
| 5,959,752 A | * | 9/1999 | Ota .............................. 359/152 |
| 5,969,837 A | * | 10/1999 | Farber et al. ................ 359/132 |
| 6,028,423 A | * | 2/2000 | Sanchez ........................ 324/96 |
| 6,239,888 B1 | * | 5/2001 | Willebrand .................. 359/118 |
| 6,494,370 B1 | * | 12/2002 | Sanchez ....................... 235/454 |

FOREIGN PATENT DOCUMENTS

| | | |
|---|---|---|
| DE | 3627 863 A1 | 2/1988 |
| DE | 296 05 201 U1 | 7/1996 |
| DE | 296 08 999 U1 | 9/1996 |
| DE | 297 16 849 U1 | 7/1998 |
| EP | 526776 A1 * | 2/1993 |
| EP | 0 784 389 A2 | 7/1997 |

* cited by examiner

Primary Examiner—Ellen E. Kim
(74) Attorney, Agent, or Firm—Sughrue Mion, PLLC

(57) ABSTRACT

An optical connection and a connection unit between individual installation units (2) is proposed for the exchange of data between devices, in which the devices (1) communicate with one another by means of optical signals, and the optical signals overcome at least the distance between two adjacent installation units.

7 Claims, 2 Drawing Sheets

OPTICAL CONNECTION AND CONNECTION UNIT FOR THE EXCHANGE OF DATA BETWEEN DEVICES

BACKGROUND OF THE INVENTION

The invention is based on an optical connection for the exchange of data between devices and a connection unit for the exchange of optical signals of the type described in the independent claims. A large number of individual devices and components are required for the most widely differing applications, which are fitted into installation units such as racks. This large number of components and devices must in general communicate with one another and exchange information and signals. An example of this is a digital switching station, in which, for example, up to 40 individual installation units may be located and must be connected to one another. For the installation of the different units it is of significance which devices must communicate with one another, depending on their individual tasks. Accordingly, the arrangement of the individual installation units within an area is a logistics problem. The data connections are, in this situation, created by the individual installation units, the individual racks, via optical fibre or wire connections. Positioning in relation to one another is therefore established in such a way that it is not possible simply to unplug and change the individual connections.

It is known in the state of the art, for example from U.S. Pat. No. 5,091,985, to connect individual devices with one another in a rack optically by means of a waveguide structure. In this situation, it is assumed that high data rates can be transferred very flexibly by optical communications. The individual components of a rack in this situation comprise a transmitter-receiver structure, which creates the image of the information on a waveguide by means of an optical imaging device, so that all the devices connected to this waveguide can receive the information from the waveguide. This structure serves to provide communication within a rack.

SUMMARY OF THE INVENTION

By contrast, the optical connection in accordance with the invention for the exchange of data between devices, which are installed in separate installation units in an enclosed space, has the advantage that the devices in the installation units communicate with one another by means of optical signals, where the optical signals overcome the distance between the installation units. As a result, a wireless connection is achieved between individual racks, which can be erected in the area as an island solution, and offers free access to optical connections with one another. For such an optical connection, light is advantageously transferred between installation units, so that it is only necessary to ensure that there is no interruption of the light path and hence of the information flow. In other words, the optical signals are transmitted wirelessly between the installation units, i.e., without employing cables, wires, etc. More specifically, the optical signals are transmitted wirelessly between connection units that are arranged on top of the installation units. In the present invention as disclosed and as claimed, the term "wireless optical signals" designates optical signals that are transmitted wirelessly, i.e., optical signals that are transmitted over a wireless connection.

The connection unit in accordance with the invention, for the exchange of optical signals, has the advantage that it includes at least one transmitter and at least one receiver, which are connected to a demultiplexer and a multiplexer. As a result, a large number of channels for the transfer of data are advantageously opened, so that the requirement for high data rates and for different data channels are fulfilled.

The quality of the transfer is advantageously monitored by a special calibration transmitter and a calibration receiver. As a result, the system can be automatically monitored and a data transfer free of complications can be assured. The synchronisation of the signals is advantageously ensured by means of a separate system clock, the signals of which are transmitted and received with the calibration signal and matched to one another. The adjustment of the connection units to one another is effected during installation of the units, in that the transmitter and receiver units are mechanically tuned to one another. To do this, the connection units are gimbal-mounted in the installation units, and can be pushed against one another and adjusted in a simple manner. The automatic monitoring for this calibration signal allows for an indication as to whether any readjustment should be undertaken.

BRIEF DESCRIPTION OF THE DRAWING

One embodiment of the invention is shown in the drawings and explained in greater detail in the following description.

DETAILED DESCRIPTION OF THE INVENTION

Figure 1:
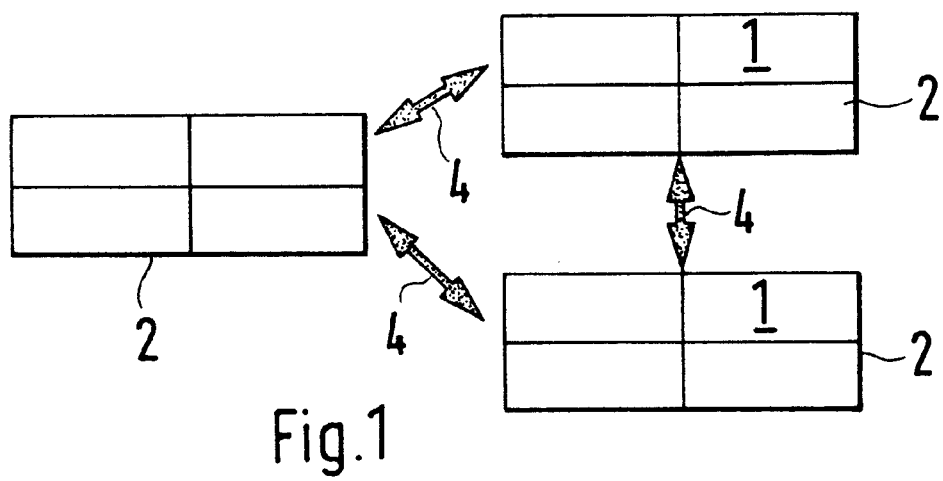
FIG. 1 shows a schematic representation of the installation units.

FIG. 1 shows the installation units 2 seen from above, in which individual devices 1 are installed. The installation units may be designed in the form of racks. The installation units can be located in any desired position in an area, in which situation their position is determined by their tasks and the possible connections. The installation units 2 communicate with one another by means of an optical connection 4.

Figure 2:
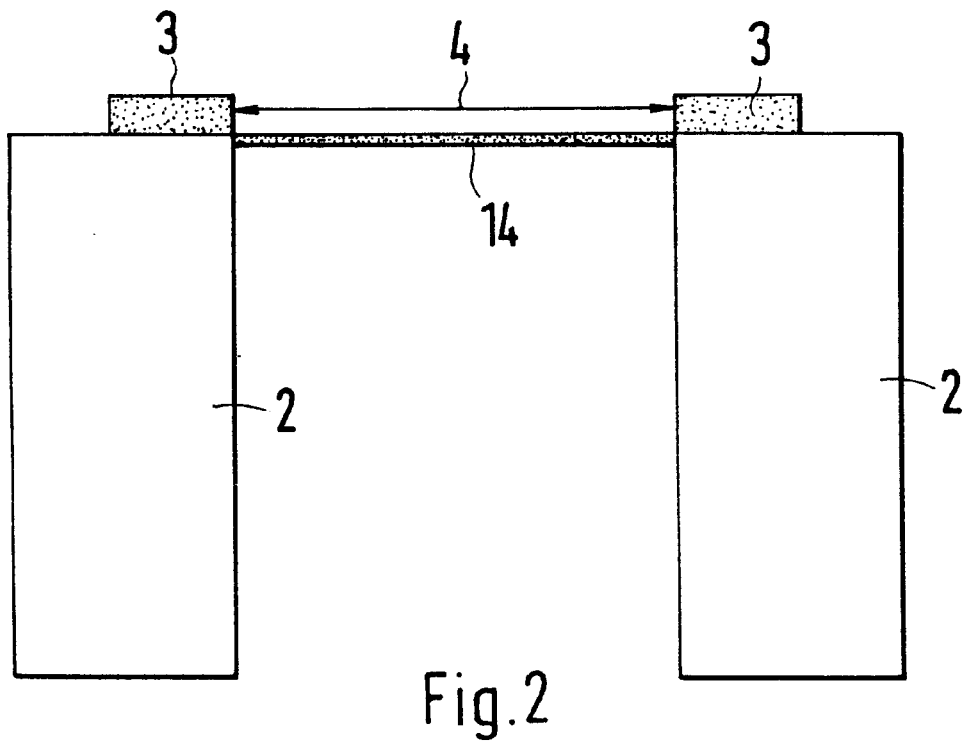
FIG. 2 shows an optical connection between two installation units and FIG. 3 shows a connection unit.

FIG. 2 shows the optical connection 4 between two installation units 2. Located on the installation units 2 are connection units 3, by means of which the optical connection 4 is established. The optical connection 4 can, as shown in this embodiment, be provided with a mechanical protection device 14. The mechanical protection device 14 serves to ensure that the optical path is not interrupted by any objects or persons and that the data communications are not thereby interrupted.

Figure 3:
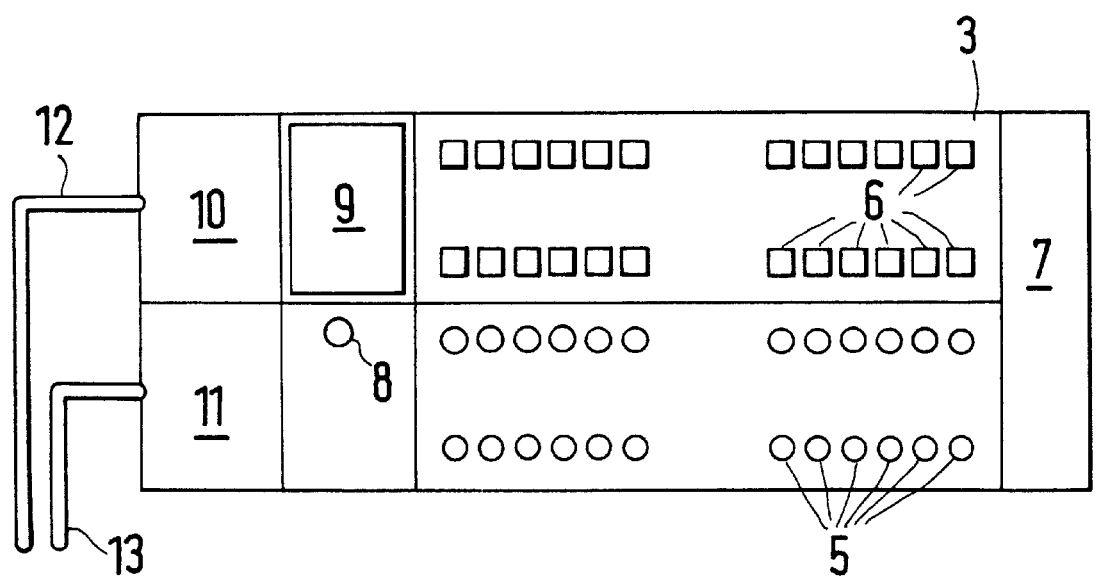

FIG. 3 shows a connection unit 3, such as is used to establish communications between the installation units. The connection unit 3 features several transmitters 5, which are connected via an input 13 and a multiplexer 11 with the devices in the installation unit. On the reception side, the connection unit 3 features a receiver 6, which delivers the information via a demultiplexer 10, across the output line 12, to the devices in the installation unit. In addition, the connection unit 3 also features a calibration transmitter 8 and a calibration receiver 9. A monitor unit 7, which is in connection both with the multiplexer 11 as well as with the demultiplexer 10, monitors the connection unit. To create the connection between the installation units, the data from the units is processed in the multiplexer and issued to the transmitter bank. The arrangement of the transmitters and their number corresponds to the requirements of the data transfer. Used in this context, for example, are infra-red diodes, with infra-red sensors provided on the reception side. As a calibration transmitter, an infra-red diode can likewise be used. The calibration receiver has a considerable surface area, so that it is possible to assess the position of the calibration signal being issued by the other connection unit. In this way it is possible to ensure that the receivers of the connection unit, with smaller surface areas, will be adequately reached by the light signal. Depending on the protocol which is being used to send and receive the data from the installation units, it is necessary to establish a common time base for the different installation units. This time base can be created in a simple manner by modulating the calibration signal. The optical connection system in accordance with the invention makes it possible to instal new installation units and new devices in a highly flexible manner and connect them by optical paths. This allows a high degree of flexibility to be achieved in the design, for example, of a switching station.

Optical communications are, however, also a simple way of doing away with elaborate and unwieldy cabling arrangements in other applications. The actuation of the connection units is possible in a simple manner and in general requires no greater expenditure than the communications between the devices already requires. Only in the situation in which larger volumes of data are to be transferred is the integration of a multiplexer and demultiplexer a requirement, in order to provide the individual transmitters of the transmitter bank and the individual receivers of the receiver bank with data, or to assess their data.

What is claimed is:

1. An optical arrangement, comprising:

a plurality of installation units disposed in an enclosed space;

a plurality of connection units to transmit wireless optical signals, each connection unit comprising at least one transmitter, which is connected to a multiplexer, and each connection unit comprising at least one receiver, which is connected to a demultiplexer; and a plurality of devices mounted in the installation units and configured to communicate with each other by the wireless optical signals transmitted from the connection units.

2. The optical arrangement of claim 1, wherein each of the connection units further comprises a calibration transmitter and a calibration receiver.

3. The optical arrangement of claim 2, further comprising a system control unit of the devices mounted in the installation units, wherein the system control unit is configured to control the connection units.

4. The optical arrangement of claim 3, wherein each of the connection units comprises a monitoring unit.

5. The optical arrangement of claim 4, wherein the optical arrangement is structured to automatically calibrate an intensity of the wireless optical signals after a calibration signal has been evaluated.

6. The optical arrangement of claim 5, wherein the optical arrangement is structured to transfer a time signal with the calibration signal.

7. The optical arrangement of claim 1, wherein the connection units are gimbal-mounted in the installation units, and wherein the connection units are mechanically adjusted in accordance with a calibration signal.

* * * * *